Patented June 11, 1929.

1,716,686

UNITED STATES PATENT OFFICE.

MOSES L. CROSSLEY, OF PLAINFIELD, NEW JERSEY, ASSIGNOR TO CALCO CHEMICAL COMPANY, OF BOUNDBROOK, NEW JERSEY, A CORPORATION OF NEW JERSEY.

PHARMACEUTICAL.

No Drawing.   Application filed March 24, 1927. Serial No. 178,152.

My invention relates particularly to improved pharmaceuticals which have enhanced economic value and more extended use in chemotherapy.

The object of my invention is to provide an improvement in pharmaceuticals, and especially in connection with antipyretics and analgesics, whereby, because of the synergic admixtures therewith of magnesium compounds, their therapeutic properties are increased or potentiated.

I have discovered that the therapeutic effects of pharmaceuticals, and particularly antipyretics and analgesics, may be potentiated by admixture therewith of magnesium compounds, some of which are, however, more suitable than others, and that the resulting synergic compositions have distinct advantages both of an economical and medicinal character over the combined effects of the products used in the compositions. In other words, by this means less of the drug is required to produce the desired effect and, accordingly, the effective therapeutic dosage may be reduced. Furthermore, I have found, in compositions of this character, that the margin between the toxic effects and the therapeutic efficiency of the drugs is increased and, accordingly, the safety of the medication is enhanced. Another advantage possessed by these synergic products is their comparatively rapid therapeutic action. They appear to act more quickly than the drugs used in the compositions.

While my invention is capable of being carried out in many different ways, for the purpose of illustration I shall describe only certain ways of carrying out my invention hereinafter.

For example, my invention may be typified by a composition containing a magnesium compound, for example, a salt such as magnesium chloride, together with a compound of the phenylcinchoninic acid series, the formula for which is—

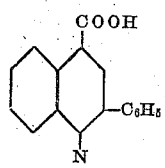

The effective therapeutic dosage of phenylcinchoninic acid (cinchophen), for example, can be reduced by approximately 30% to 50% of the doses previously found necessary by the presence of magnesium chloride used therewith. Cinchophen is usually administered in 7½ grain tablets. I have found that instead thereof there can be used effectively a tablet containing approximately 3 grains of cinchophen and 4½ grains of magnesium chloride. In this manner, the relative proportion of the magnesium compound to the drug is not in any way limited, but can be used in as large a quantity as would be found effective therewith for the purposes desired. Medication by this means can be accomplished at less cost than when using phenylcinchoninic acid alone, but, in addition, the toxicity of the effective dosage is less and the desired therapeutic effect is secured in a shorter period of time. This is highly advantageous, especially where the product is administered per os, and where some time must elapse between the administration and the arrival of the drug at the point where its therapeutic effects are manifested. My invention is not limited, however, to any particular method of administration. Also, it will be understood that it is not entirely necessary to administer the constituents of the composition in the form of an intimate mixture.

Instead of the phenylcinchoninic acid as referred to in the above example, I may use other derivatives thereof, as, for example, salts of phenylcinchoninic acid, or other derivatives such as the 6-methyl-phenylcinchoninic acid, the esters of phenylcinchoninic acid, the esters of 6-methyl-phenylcinchoninic acid, etc. Other antipyretics and analgesics which I may use in this connection are the following:

Salicylates, particularly aspirin; acetanilid; phenacetin; antipyrene; pyramidon; quinine.

It will be found that the therapeutic properties of these various pharmaceuticals are potentiated and modified in a similar manner as in the case of the use of phenylcinchoninic acid above referred to. The clinical results obtained by means of these several compositions are of a similar order of magnitude.

Synergic products of this kind are particularly effective in rheumatic fever, neuralgia, neuritis, and other inflammatory conditions, for which compounds of the phenylcinchoninic acid series are especially valuable remedies.

The proportions and percentages used herein are merely illustrative of the practical application of my invention and may be varied within wide limits.

While I have described my invention above in detail I wish it to be understood that many changes may be made therein without departing from the spirit of the same.

I claim:

1. A pharmaceutical product comprising a synergic composition containing a magnesium compound and a synthetic aromatic drug, the therapeutic properties of which are accentuated by the magnesium compound.

2. A pharmaceutical product comprising a synergic composition containing a magnesium compound and a drug containing a phenylcinchoninic acid radical, the therapeutic properties of which are accentuated by the magnesium compound.

3. A pharmaceutical product comprising a synergic composition containing a magnesium compound and cinchophen, the therapeutic properties of which are accentuated by the magnesium compound.

4. A pharmaceutical product comprising a synergic composition containing magnesium chloride and a synthetic aromatic drug, the therapeutic properties of which are accentuated by the magnesium chloride.

5. A pharmaceutical product comprising a synergic composition containing magnesium chloride and a drug containing a phenylcinchoninic acid radical, the therapeutic properties of which are accentuated by the magnesium chloride.

6. A pharmaceutical product comprising a synergic composition containing magnesium chloride and cinchophen, the therapeutic properties of which are accentuated by the magnesium chloride.

7. A pharmaceutical product comprising a synergic composition containing a magnesium compound and an aromatic antipyretic, the antipyretic properties of which are increased by the magnesium compound.

8. A pharmaceutical product comprising a synergic composition containing magnesium chloride and an aromatic antipyretic, the antipyretic properties of which are accentuated by the magnesium chloride.

9. A pharmaceutical product comprising a synergic composition containing a magnesium compound and a synthetic aromatic analgesic, the analgesic properties of which are accentuated by the magnesium compound.

10. A pharmaceutical product comprising a synergic composition containing magnesium chloride and a synthetic aromatic analgesic, the analgesic properties of which are accentuated by the magnesium chloride.

In testimony that I claim the foregoing, I have hereunto set my hand this 16th day of March, 1927.

MOSES L. CROSSLEY.